US00RE47533E

(19) United States
(12) Reissued Patent
Bartlett

(10) Patent Number: US RE47,533 E
(45) Date of Reissued Patent: Jul. 23, 2019

(54) METHOD AND SYSTEM OF SECURING ACCOUNTS

(71) Applicant: AAA Internet Publishing Inc., Kelowna (CA)

(72) Inventor: Rob Bartlett, West Kelowna (CA)

(73) Assignee: AAA Internet Publishing Inc., West Kelowna (CA)

(21) Appl. No.: 15/604,182

(22) Filed: May 24, 2017

Related U.S. Patent Documents

Reissue of:
(64) Patent No.: 9,087,183
Issued: Jul. 21, 2015
Appl. No.: 13/529,937
Filed: Jun. 21, 2012

U.S. Applications:
(63) Continuation-in-part of application No. 12/444,133, filed as application No. PCT/CA2007/001767 on Oct. 4, 2007, now abandoned.

(60) Provisional application No. 60/849,008, filed on Oct. 4, 2006.

(51) Int. Cl.

| | |
|---|---|
| ***G06F 21/31*** | (2013.01) |
| ***G06F 21/32*** | (2013.01) |
| ***G06F 21/44*** | (2013.01) |
| ***H04L 29/06*** | (2006.01) |
| ***H04W 12/12*** | (2009.01) |

(52) U.S. Cl.
CPC ..... *G06F 21/31* (2013.01); *G06F 21/32* (2013.01); *G06F 21/44* (2013.01); *H04L 63/0876* (2013.01); *H04L 63/107* (2013.01); *G06F 2221/2111* (2013.01); *H04W 12/12* (2013.01)

(58) Field of Classification Search
CPC ... G06G 21/31; H04L 63/107; H04L 63/0876; G06F 21/32; G06F 21/44; G06F 2221/2111; H04W 12/12; G06Q 20/00; G06Q 20/3674; G06Q 20/382; G06Q 20/367; G06Q 20/409; G06Q 20/401; G06Q 20/3821; G06Q 20/38215; G06Q 20/02; G06Q 20/0855; G06Q 20/027
USPC ..... 726/2–7; 723/182–186
See application file for complete search history.

(56) References Cited

U.S. PATENT DOCUMENTS

| | | | | |
|---|---|---|---|---|
| 5,696,824 | A * | 12/1997 | Walsh | G06K 7/10 705/72 |
| 6,707,915 | B1 * | 3/2004 | Jobst et al. | 380/247 |
| 6,845,453 | B2 * | 1/2005 | Scheidt et al. | 726/5 |
| 10,009,378 | B2 * | 6/2018 | Chiviendacz | G06F 21/36 |
| 2002/0147913 | A1 * | 10/2002 | Lun Yip | 713/184 |
| 2004/0172531 | A1 * | 9/2004 | Little et al. | 713/155 |
| 2004/0187018 | A1 * | 9/2004 | Owen et al. | G06F 21/31 713/184 |
| 2004/0192256 | A1 * | 9/2004 | Kuwajima | 455/411 |

(Continued)

*Primary Examiner* — Jalatee Worjloh
(74) *Attorney, Agent, or Firm* — Venable LLP; Michele V. Frank

(57) ABSTRACT

A method and system of securing account is provided. When a client computer requests access to an account accessible via a server, the server determines a MAC address associated with the client computer and compares it to a MAC address associated with the account. If the MAC address of the client computer is not the same as the MAC address associated with the account, the server initially denies access to the client computer, but may allow access after verification of the client computer by the user associated with the account.

19 Claims, 6 Drawing Sheets

(56) References Cited

U.S. PATENT DOCUMENTS

| | | | | |
|---|---|---|---|---|
| 2005/0015587 | A1* | 1/2005 | Stransky | 713/156 |
| 2006/0068799 | A1* | 3/2006 | Morton et al. | 455/450 |
| 2006/0069921 | A1* | 3/2006 | Camaisa | G06F 21/31 713/182 |

* cited by examiner

METHOD AND SYSTEM OF SECURING ACCOUNTS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

This application claims the benefit of U.S. Provisional Patent Application No. 60/849,008, filed Oct. 4, 2006, and is a continuation in part of U.S. patent application Ser. No. 12/444,133, filed Apr. 2, 2009 (371(c)), both of which are hereby incorporated by reference.

FIELD OF THE INVENTION

This invention relates to methods and systems of conducting secure transactions over a computer network, and more particularly to securing authentication systems used in such transactions.

BACKGROUND OF THE INVENTION

Networks, particularly the global computer network known as the Internet, are now used for many purchases and other business transactions, usually by means such as a credit card. A key component of these credit card transactions is the ability to authenticate the holder of the credit card, as the absence of signatures and face-to-face contact between the transacting parties makes authentication of the credit card holder difficult.

At present, malicious users can gain unauthorized access to online accounts and/or credit cards of account users by hacking, or stealing or phishing passwords or personal info. These accounts may include game accounts, bank accounts, and online payment processing systems like those offered by PayPal™ or credit card processors. Currently, the preferred way to offer significant security online is to request additional security questions from the user, which is an inconvenience to the user, and possibly a further security risk. Most online authentication systems therefore trade convenience for security.

Online banking tends to have significantly better security compared to payment systems for other account providers such as PayPal, or accounts for online games. This is because if a malicious user gains access to an online bank account, they can do a significant amount of damage, and the bank may be liable (they have no merchants on whom to offload the liability). Therefore, it is in the bank's best interest to ensure that it is difficult to access an online bank account. Some banks use cookies and additional security questions to secure their systems, but, as described above, this is an inconvenience to clients.

Most account providers, such as game companies and payment processors, have relatively weak authentication systems. Once a password is known, a malicious user may access accounts and misuse such accounts, usually from any computer. The account provider and/or the account user must take steps to protect their account. As an example, PayPal requests an account user to verify their account and address at registration, but once that is completed, only a single password is needed to allow access to the account.

Credit card processors typically ask account users for address verification and the Credit Card Verification (CCV) number on the back of the card; and may also ask account users for a password. If a malicious user accesses this information, they may make fraudulent orders with the credit card. Therefore, it is up to the merchant accepting the credit card to protect themselves against malicious users as the credit card payment processor will not usually take the necessary steps to do so (for example by comparing the Internet Protocol (IP) address of the client computer operated by the credit card user to the region in which the order is being made, or calling the credit card user).

Internet service providers (ISPs) may restrict access of users to the Internet, often based on the Media Access Control (MAC) address of the computer being used. If a user tries to connect a new computer to the ISP using an Internet connection, they may have to register the new MAC address with the ISP before receiving permission. The MAC address of a computer is a unique identifier that can correctly identify a particular computer on a local area network. It is possible to spoof or change a MAC address, but typically it is only possible to discover the MAC address of a computer from the same local area network.

Some account providers, such as online banks, use improved security systems which are cookie based. These systems ask an account user to "remember this computer" or "remember this password" after asking one or two security questions. Once the computer is registered, these extra questions are not asked again unless the cookies are deleted from the computer. A deficiency of this system is that it requires the use of cookies, which is not permitted by all account users and many account users do not want to provide answers to additional security questions to access their account.

There have been various attempts in the prior art to solve this account user authentication issue, including U.S. Patent Publication No. 2004/0117321 to Sancho, for a system and method for secure network purchasing. Sancho discloses that once a merchant/client transaction is initiated, that it can be traced back to the originating computer using the IP address of that computer, which does not change during the transaction.

U.S. Patent Publication No. 2005/0177442 to Sullivan et al., for a method and system for performing a retail transaction using a wireless device, discloses a method of identifying a wireless Internet connection for an online purchase, and matching a customer account with transaction data. This system is dependent on a customer account registered with the wireless device, and requires the computer to already have a registered customer account.

U.S. Patent Publication No. 2005/0033653 to Eisenberg et al., for an electronic mail card purchase verification, discloses a method of looking for additional information about the purchaser to verify that the transaction is not suspicious. This application discloses an automation process for standard security checks known in the art.

U.S. Patent Publication No. 2004/0243832 to Wilf et al., for a verification of a personal identifier received online, discloses a method of ensuring secure communication between two computers over a connection.

PCT Patent Application No. WO 2004/027620 to Freidman et al., for an authentication system and method, discloses an authentication system with proprietary identification codes, which must be installed on the client/authenticating computers. The MAC address of the computer is used along with other system details to produce a unique identifier for the client computer that is software dependent.

A system that requires such a software installation may be difficult to implement (and account users may not want to install additional software). Such systems also limit the account user to a single computer, and must be reinstalled when making a purchase or accessing an account from a new computer. If any system is too complicated, while it may be secure, it may not practical in application. This is a reason why most current authentication systems (with the exception of bank accounts and very secure sites) are poor, as they trade convenience for security.

PCT Patent Application No. WO 2006/083063 to Park, for a system and method for mediating and conducting peer-to-peer electronic commerce, discloses a method of allowing people who don't have a commercial website to have their product details spidered and sold on a regular website.

U.S. Patent Publication No. 2006/0068785 to Kamijo et al., for a secure communication over a medium, discloses a process to assist in securing insecure communications using a cell phone.

U.S. Patent Publication No. 2005/0209876 to Linlor, for a secure money transfer between hand-held devices, discloses a method of storing a clients billing information in a database and then making a purchase from their computer using a Personal Identification Number (PIN) or biometrics to identify themselves.

It is an object of the present invention to obviate or mitigate the above disadvantages.

SUMMARY OF THE INVENTION

What is needed is a system that is pre-emptive and uses technology already available on every computer that accesses the Internet; so that additional software may not be required on the client computer operated by the account user. The system according to the invention preferably uses a database independent of the client computer, and works in conjunction with traditional authentication systems, or optionally without traditional authentication at all (such as with standard online credit card transactions).

The system according to the invention includes a method to determine one or more unique profile identifiers of a computer and optionally other identifying details from outside the local area network (e.g., via the Internet) using common online scripting languages.

Authentication is not required for the system according to the invention to function; instead the system assists in securing existing authentication systems and online credit card transactions. The system is also comprehensive and complete, actually offering an automated security solution when suspicious transactions are made. In addition to specifying the computer used in any online transaction using one or more unique profile identifiers of the computer, the system according to the invention may also show the IP address of the connecting computers between the client computer and the receiving server. This allows administrators to determine if the alleged account user is using spoofing technology to try and hide their identity. The system according to the invention may be used for law enforcement, by discreetly capturing significant data from online criminals and terrorists.

For an additional level of security, more stringent computer identification may be implemented and biometrics may be integrated with the system according to the invention to gain access to highly sensitive online accounts for government and law enforcement.

The security system according to the invention is a companion for existing authentication and processing systems. The system may provide for:

1. a reduction in hacking, fraudulent charges, and staff needed to administer a current security system;
2. an improvement in client/merchant satisfaction, and the ability to use the effectiveness of the system as selling point;
3. revenue potential (for payment processors and publishers) for the enhanced security services;
4. creation of highly secure authentication systems for federal or law enforcement applications accessible via the Internet;
5. elimination of the threat of fraudsters or hackers using IP spoofing to hide their identities and commit fraud; and
6. Provision of a system useful for espionage and for law enforcement to collect data from online criminals or terrorists.

A system for enhancing security between a client and a server is provided, including: a database, accessible by the server, the database having a record associated with an account, the account associated with one or more unique profile identifiers; wherein when the client accesses the account, the server receives the one or more unique profile identifiers associated with the client and compares the one or more unique profile identifiers associated with the client to the one or more unique profile identifiers associated with the account, and if one or more unique profile identifiers associated with the client is the same as the one or more unique profile identifiers associated with the account, permits access to the account.

In one aspect, the present invention provides a system for enhancing security between a client and a host server, comprising:

a host server;

a database, accessible by the server, said database comprising a record associated with an account, said account associated with at least one unique profile identifier;

wherein when said client accesses said account, said server receives said at least one unique profile identifier associated with said client and compares said at least one unique profile identifier associated with said client to said at least one unique profile identifier associated with said account, and if said at least one unique profile identifier associated with said client is the same as said at least one unique profile identifier associated with said account, permits access to said account.

If the one or more unique profile identifiers associated with the client is not the same as the one or more unique profile identifiers associated with the account, the server communicates with said client to determine if access to the account should be permitted.

The account may associated with a geographic area, and the server receives an IP address associated with the client, and if the geographic area associated with the IP address is not the same as the geographic area associated with the account or one or more unique profile identifiers of the client is not the same as the one or more unique profile identifiers associated with the account, the server denies access to the account. If the geographic area associated with the IP address is not the same as the geographic area associated with the account and the one or more unique profile identifiers of the client is not the same as the one or more unique profile identifiers associated with the account, the server may notify law enforcement of the IP address and of the one or more unique profile identifiers of the client.

The account may be associated with biometric information related to a user, and the server receives the biometric information from the client.

DESCRIPTION OF THE FIGURES

Exemplary embodiments are illustrated in referenced figures of the drawings. It is intended that the embodiments and figures disclosed herein are to be considered illustrative rather than restrictive.

Figure 1:
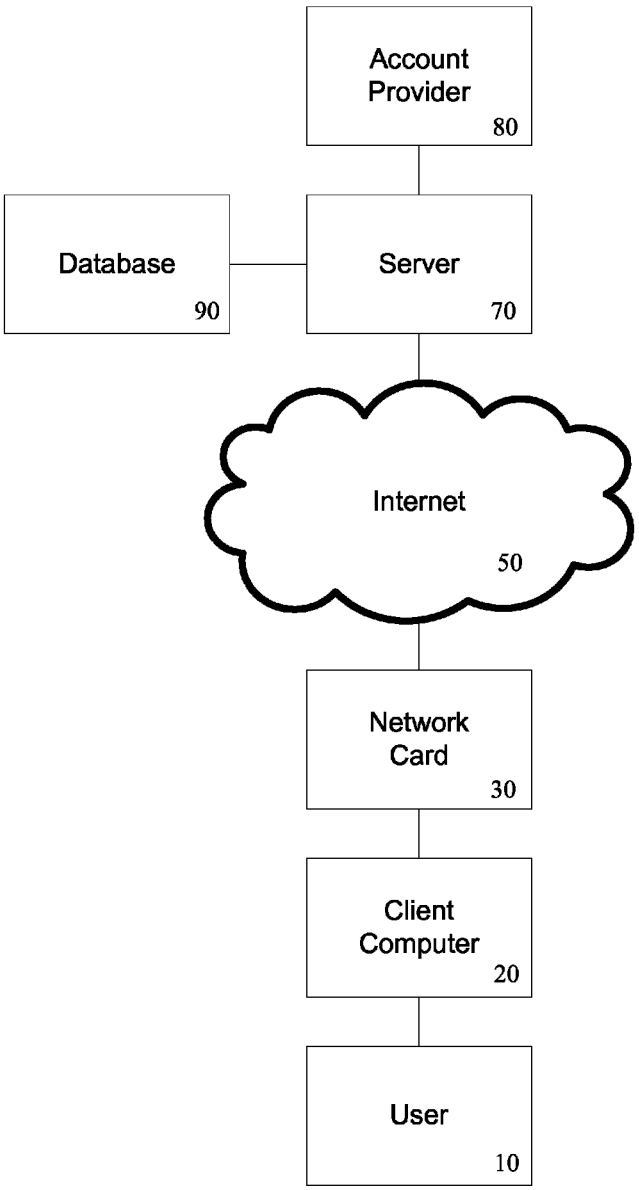
FIG. 1 is a block diagram of a system according to the invention.

To reiterate, the figures depict an embodiment of the present invention for purposes of illustration only. One skilled in the art will readily recognize from the following description that alternative embodiments of the structures and methods illustrated herein may be employed without departing from the principles of the invention described herein

DETAILED DESCRIPTION OF THE INVENTION

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Terms

The term "invention" and the like mean "the one or more inventions disclosed in this application", unless expressly specified otherwise.

The terms "an aspect", "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the disclosed invention(s)", unless expressly specified otherwise.

The term "variation" of an invention means an embodiment of the invention, unless expressly specified otherwise.

A reference to "another embodiment" or "another aspect" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The term "plurality" means "two or more", unless expressly specified otherwise.

The term "herein" means "in the present application, including anything which may be incorporated by reference", unless expressly specified otherwise.

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "e.g." and like terms mean "for example", and thus does not limit the term or phrase it explains. For example, in a sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "respective" and like terms mean "taken individually". Thus if two or more things have "respective" characteristics, then each such thing has its own characteristic, and these characteristics can be different from each other but need not be. For example, the phrase "each of two machines has a respective function" means that the first such machine has a function and the second such machine has a function as well. The function of the first machine may or may not be the same as the function of the second machine.

The term "i.e." and like terms mean "that is", and thus limits the term or phrase it explains. For example, in the sentence "the computer sends data (i.e., instructions) over the Internet", the term "i.e." explains that "instructions" are the "data" that the computer sends over the Internet.

Any given numerical range shall include whole and fractions of numbers within the range. For example, the range "1 to 10" shall be interpreted to specifically include whole numbers between 1 and 10 (e.g., 1, 2, 3, 4, . . . 9) and non-whole numbers (e.g. 1.1, 1.2, . . . 1.9).

Where two or more terms or phrases are synonymous (e.g., because of an explicit statement that the terms or phrases are synonymous), instances of one such term/phrase does not mean instances of another such term/phrase must have a different meaning. For example, where a statement renders the meaning of "including" to be synonymous with "including but not limited to", the mere usage of the phrase "including but not limited to" does not mean that the term "including" means something other than "including but not limited to".

Neither the Title (set forth at the beginning of the first page of the present application) nor the Abstract (set forth at the end of the present application) is to be taken as limiting in any way as the scope of the disclosed invention(s). An Abstract has been included in this application merely because an Abstract of not more than 150 words is required under 37 C.F.R. section 1.72(b). The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed invention (s) are widely applicable to numerous embodiments, as is readily apparent from the disclosure. One of ordinary skill in the art will recognize that the disclosed invention(s) may be practiced with various modifications and alterations, such as structural and logical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

No embodiment of method steps or product elements described in the present application constitutes the invention claimed herein, or is essential to the invention claimed herein, or is coextensive with the invention claimed herein, except where it is either expressly stated to be so in this specification or expressly recited in a claim.

The invention can be implemented in numerous ways, including as a process, an apparatus, a system, a computer readable medium such as a computer readable storage medium or a computer network wherein program instructions are sent over optical or communication links. In this specification, these implementations, or any other form that the invention may take, may be referred to as systems or techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A key aspect of the present invention is the use (by for example, a host) of one or more unique profile identifiers of a computer (for example, associated with a client computer) to determine whether access to said host server will be allowed, partially allowed or declined. As used herein, "one or more" if preferred but "at least one" unique profile identifier must be assessed by the host server. Both the requisite degree of match and/or number of required matches may be set in the security system or protocol of the host server. In other words, an entire spectrum of varying degrees of security clearance can be created based upon the pre-selection (by the host server) of 1) which unique profile identifiers of a client computer must match those on a client account and 2) how many unique profile identifiers of a client computer must match those on a client account.

An administrator of the server may create such levels of a security as is desired for any given client or client grouping.

The unique profile identifiers may be multiple system components, including, but not limited to:

a. CPU serial and/or model number.
b. Motherboard serial and/or model number.
c. Hard Drive serial and/or model number.
d. Admin SSID or UUID provided by the operating system.
e. Computer manufacturer system serial number and/or model number.
f. CD-ROM, DVD-ROM or other internal mass media storage device serial and/or model number.
g. BIOS serial and/or model number.
h. MAC address.
i. Monitor serial and/or model number.
j. RAM serial and/or model number.
k. Any universally unique identifier (UUID) or globally unique identifier (GUID) or any other identifier specific to any vendor or device which may be obtained from the computer or Internet capable device from installed hardware or software components.
l. BIOS Manufacturer,
m. BIOS Release Date,
n. Vendor and Device IDs of all installed PCI devices In a most preferred from, the method and system for enhancing security between a client and a server:

1. the hardware and/or software profile (including one or more unique profile identifiers) of a "connecting computer" is analyzed by a client-side application or script and the data is sent to a secure host server;
2. the host secure server assesses this profile data (including one or more unique profile identifiers) to verify the identity of the "purported client" computer;
3. the unique profile identifiers of the "purported client" computer is determined by comparing the profile (including one or more unique profile identifiers) of the account profile of the actual client as compared to the profile (including one or more unique profile identifiers) of the purported client;
4. if the unique profile identifiers of the "purported client" computer closely matches the unique profile identifiers of the existing registered client computer on account, access may be granted;
5. if the unique profile identifiers of the "purported client" computer does not match the unique profile identifiers of the existing registered client computer on account, access may be denied;
6. if the unique profile identifiers of the "purported client" computer partially matches the unique profile identifiers of the existing registered client computer on account, access may be granted, at discretion of host server;

The "profile match level" may be determined by an administrator to balance user convenience and security.

The system as provided herein allows for multiple unique profile identities to be added to the access list for a single account or online resource. Preferably, there is a logging system, which allows tracking of the activities of unique profile identifiers by a host administrator. Such an administrator may decide to block unique profile identities that have been involved in malicious activities. The logging system allows a user to see individual computers/profiles that have been accessing their online account, and blocking or allowing access for each computer.

If a proxy IP or IP spoofing is detected, both the proxy IP and true IP address will be recorded, which may be used by an administrator to determine if a user is trying to hide his/her identity for improper or malicious purposes.

It should also be noted that while the system and method as described herein protect online accounts very well, they can also be used to offer online protection even when a username/password combination is not normally provided. The system and method as described herein can be used to protect any unique identifier used online, such as a credit card number or a membership number for example. This allows these online resources/IDs to be protected without actually requiring an online account to be created. IDC could easily be used to create online use only secure credit cards or payment accounts like PayPal that would only work from registered computers. IDC can also be used to enforce online software licensing as another example.

Lastly, the system and method as described herein can be used to verify and validate the true identity of the person that you are dealing with online. From e-mail accounts, Facebook, Twitter, Youtube, any social networking account, etc. . . . there is created the certainty that a user is interacting with the real person from such person's own authorized computer, and not some imposter/hacker.

The system, according to the invention, restricts access to an account (or a credit card) based on one or more unique profile identifiers of the network card 30 in client computer 20 used by the account user 10. Each network card 30 is identifiable by one or more unique profile identifiers.

A typical system incorporating the invention is shown in FIG. 1. In this case, the unique profile identifier is noted as the MAC address. Account user 10, accesses the Internet 50 via client computer 20 to communicate with a server 70 operated by account provider 80. Server 70 may be a single computer, software running on a computer, or a plurality of computers. Server 70 communicates with database 90 which may be within server 70 or one or more computers in communication with server 70. Account provider 80 also has access to database 90. Client computer 20 includes a network card 30 for communications, network card 30 having a MAC address.

To use the secure account, the MAC address of the client computer must be registered with the server permitting access to the account. If client computer 20 tries to access an account or use a credit card via an unregistered computer (and therefore unregistered MAC address), then the registered account user 10 may be notified by e-mail and/or by phone, and the account, transaction or credit card can be suspended due to the suspicious action until the account user 10 verifies the transaction. If account user 10 was just using a different, unregistered computer, account user 10 can respond to the notification and the account can be reactivated without intervention from a "live" person.

The MAC address of a particular computer is positioned one level below an IP address, and within a local network it can be determined by sending an "arp-a" request. MAC addresses of computers accessing the Internet are determined and used by ISPs routinely to restrict or allow access to the Internet by sending a Dynamic Host Configuration Protocol (DHCP) request or an Address Resolution Protocol (ARP) request to the client computer. These requests involve sending a message to the client computer 20 with the request, which in turn responds with the MAC address.

Communications sent through the Internet only retain the MAC address of the last IP/Hop in the transmitted packet, meaning that the MAC address of the original client computer 20 is not usually preserved as the packet goes from router to router throughout the Internet. However, there are several ways of determining the MAC address of client computer 20, including the following:

1. Capturing the MAC address from the first router or hop receiving the packet from client computer 20. Such a method requires a series of queries of previous routers and requires cooperation from the ISPs involved.
2. "Spoofing" a DHCP packet or ARP request with the connecting computer (as sent from the local subnet) and storing the resulting MAC address in a text file to be sent back to the requesting server 70.
3. Using a script that reports the MAC address and may also report the IP address and/or host name of client computer 20 for a message received from a connecting computer. For the purposes of law enforcement, additional details could be determined for investigation of criminals or terrorists. A secure script, digitally signed by a well-known and secure source, will allow users to run the script without security warnings. Such a script can be created using commonly used Internet scripting languages, or the script can be included as an application add-on or plug-in for computer programs or websites that use authentication; or the script may be a small stand alone application distributed by credit card issuers or payment processors.

In a preferred embodiment of the invention, more than one of these means for obtaining a MAC address may be used.

Microsoft™ or Java™ software may be used to implement the system in order to provide scripts with compatibility with most systems. The system is designed for maximum compatibility and discreet operation. In a preferred embodiment, code implementing the method according to the invention is downloaded from a web server and then executed on client computer 20 and account provider server Embodiment Using ActiveX™ Controls The system and method according to the invention may be implemented using ActiveX controls, which are software components based on the Component Object Model (COM™) environment provided by Microsoft™. Like Java applets, ActiveX controls 100 can be used to add rich content to web pages. Unlike applets, ActiveX controls 100 are limited to use in Microsoft's Internet Explorer™ web browser.

In the context of this document, the term "ActiveX" is used to refer to the technology that downloads and runs controls in one of the formats supported by the "Authenticode" code signing system, and corresponds to controls that can be declared from a web page using an OBJECT tag. Such controls include: COM controls (filetypes .DLL and .OCX); Win32 executable files (filetype .EXE); INF set-up files, used to specify locations and versions for a collection of other files (filetype .INF); and "cabinet" files that are referred to by an OBJECT tag (filetype .CAB). These controls are all treated in a very similar way by web-enabled ActiveX container 120 applications, including in the use of the same caching and versioning mechanisms.

ActiveX controls 100 are highly portable COM objects, and are used extensively throughout Microsoft Windows platforms and, especially, in web-based applications. COM objects, including ActiveX controls 100, can invoke each other locally and remotely through interfaces defined by the COM architecture. The COM architecture allows for interoperability among binary software components produced in disparate ways.

If an ActiveX control 100 is not installed locally, it is possible to specify a URL where the control can be obtained by account user 10. Once obtained, the control 100 installs itself on client computer 20 automatically if permitted by the browser. Once it is installed, it can be invoked without the need to be downloaded again.

ActiveX controls 100 can be signed or unsigned. A signed control provides a high degree of verification that the control was produced by the signer and has not been modified. As ActiveX controls 100 do not run in a limited environment or "sandbox", it is important to have a high degree of trust in the author of the control.

The system and method according to the invention may be implemented using an ActiveX control 100, herein referred to as an "secureIDx control". The secureIDx control uses several programmatic elements to interact efficiently with a control container and with account user 10. These programming elements may be: class ColeControl 130; a set of event-firing functions; and a dispatch map.

The secureIDx control object inherits a set of features from its MFC base class, ColeControl 130. These features include in-place activation and Automation logic. COleControl can provide the control object with the same functionality as an MFC window object and the ability to fire events. COleControl can also provide windowless controls, which rely on their container 120 for some of the functionality a window otherwise provides, but offers faster display than windows. The fired events are used to notify the control container when something important happens in the control. The automatic logic in the secureIDx control interacts with client computer 20 and creates a unique signature for client computer 20. This unique identity of client computer 20 works as an authentication token in addition to the existing authentication systems, or as an identity token itself. SecureIDx is derived from client computer 20's unique profile identifiers and may also be derived from the client computer's IP Address or the account user's biometrics.

Figure 4:
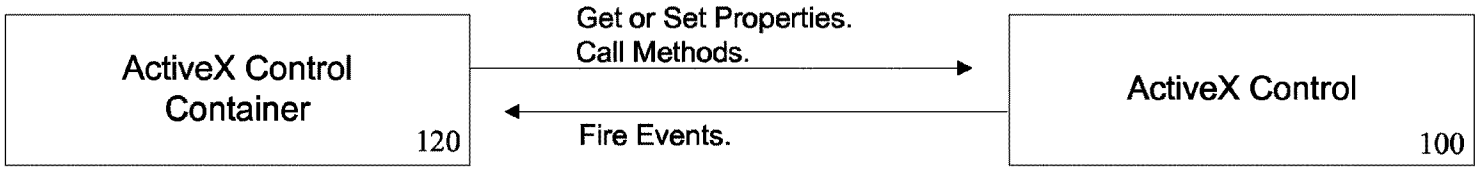
FIG. 4 is a block diagram showing the interaction between an ActiveX Control Container and a Windowed ActiveX Control.
Figure 5:
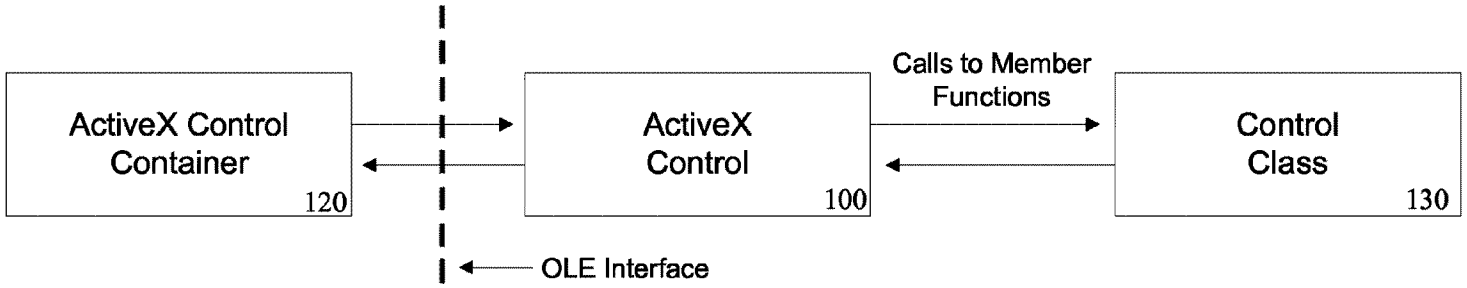
FIG. 5 is a block diagram showing communication between an ActiveX Control Container and an ActiveX Control.

When a control 100 is used within a control container 120, it uses two mechanisms to communicate: it exposes properties and methods, and it fires events. FIGS. 4 and 5 demonstrate how these two mechanisms are implemented.

ActiveX controls 100 are an integral part of systems and applications, and they are required for essential functions in many environments. Though priorities many change from organization to organization and user to user, it is important to understand the tradeoffs between functionality and security and to make informed decisions about the appropriate level of risk.

Authenticode and Software Signing

Software downloaded from the Internet to client computers 20 may contain unauthorized programs or viruses intended to cause damage or provide clandestine network access for malicious users. As networks become more interconnected, the threat of malicious software and viruses has extended. To counter this growing threat, Microsoft developed Authenticode™ technology to enable developers to digitally sign software using standard X.509 public key certificates. Account users can verify the publisher of digitally signed software as well as verify that the software has not been tampered with, because the publisher has signed the code. For software distributed on the Internet, most users are more likely to trust software signed by certificates issued by a reputable commercial certification authority. Therefore, if software is distributed via the Internet, it is useful to obtain the services of a commercial certification authority to issue digital signing certificates to sign the application.

Java Embodiment

The system and method according to the invention can also be implemented using Java. Java refers to a programming language; a virtual machine designed to run that language (also known as the "JVM"); and a set of APIs and libraries. The libraries are written in a combination of Java and other programming languages, for example C and C++.

The Java language is object-oriented, with all code defined as part of a class. When the software is implemented using a JVM, these classes are dynamically loaded as modules of code that can be separately compiled. Classes are stored and represented as a sequence of bytes in a standard format, called the classfile format. (They need not be stored in files as such—it is possible to create and load classfiles on the fly, for example by downloading them from a network.)

Java's security model is based on several layers of verification, including: checking the structure of each classfile to make sure that it conforms to the classfile format; checking the sequence of instructions within each method to make sure that each instruction is valid, that there are no invalid jumps between instructions, and the arguments to each instruction are of the correct type. The JVM instruction set is designed to allow this analysis to be tractable; as classes are dynamically linked, consistency checks make sure that each class is consistent with its superclasses, e.g. that final methods are not overridden, and that access permissions are preserved; security restrictions are imposed on which packages can be accessed which can be used to prevent access to implementation classes that would not normally be needed by applets, for example; and runtime checks are performed by some instructions. For example, when an object is stored in an array, the interpreter (or compiled code) checks that the object to be stored is of the correct type, and the array index is not out of bounds.

This security scheme does not depend on the trustworthiness of the compiler that produced the classfiles (or on whether the code was compiled from source in the Java language or from another language). The compiler for the standard API libraries must be trustworthy, but this can be ensured because the standard libraries are provided by the JVM implementation. However, the scheme is complicated, and quite difficult to implement correctly. The presence of several layers increases the potential for error; a flaw in any layer may cause the whole system to collapse. This is offset against the increased efficiency over a fully interpreted language implementation where all checking is done at run-time (such as the current implementations of JavaScript and VBScript, or of Safe-Tcl and Safe-Perl).

An applet is a software component that runs within a larger application. Java applets run in the context of a Java-enabled web browser. The web browser is responsible for maintaining the environment or "sandbox" that manages the applet's resource access. In practice, this usually serves to prevent the applet from accessing the local filesystem on client computer. The browser downloads the applet code from a web server and either embeds the applet into an HTML page or opens a new browser window to show the applet user interface. The default security manager denies applets all access to the filesystem and all network access except to the web host that supplied the applet.

The method and system may be incorporated into an applet, referred to herein as secureBox. The secureBox applet is a signed applet that once trusted by a client computer runs harmlessly on the client computer with a strict security policy. The applet securely enumerates the user's computer identity by recording the MAC address and optionally the client computer 20's IP address and/or the account user's biometric information and posts such identity to server 70 which authenticates or generates alerts based on submitted identification.

Applets do have several disadvantages. For example, applets require a Java plug-in, which is not always available. Some organizations do not permit users to install software, so these users might not view applets by default. There are also performance issues. The applet cannot run until the Java Virtual Machine is initialized, and this delay can be significant. Applets usually execute at a speed that is comparable to, but slower than, compiled applications. Finally, Java applets are considered more difficult and expensive to develop than html based pages.

Figure 6:
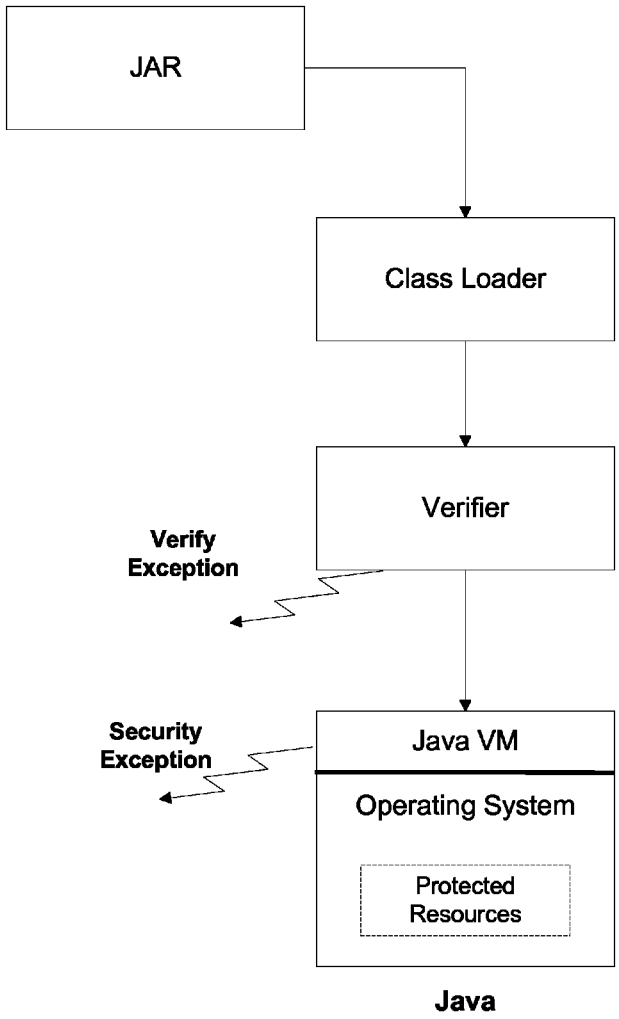
FIG. 6 is a block diagram showing a Java security architecture.

The JAR file format is a convention for using PKWARE™'s ZIP format to store Java classes and resources that may be signed. All JAR files are ZIP files, containing a standard directory called "/META-INF/". The META-INF directory includes a "manifest file", with name "MANIFEST.MF", that stores additional property information about each file (this avoids having to change the format of the files themselves). It also contains "signature files", with filetype ".SF", that specify a subset of files to be signed by a given principal, and detached signatures for the .SF files. A typical Java security architecture is shown in FIG. 6.

Deploying Downloadable Code

Both Java and ActiveX authenticate code by signing it using a digital signature scheme. Digital signatures use public-key cryptography; each signer has a private key, and there is a corresponding public key that can be used to verify signatures by the signing party. Assuming that the digital signature algorithm is secure and is used correctly, it prevents anyone but the owner of a private key from signing a piece of data or code.

An alternative approach to signing for authenticating controls, would be to secure the connection between the web site and the browser, using a transport protocol such as SSL 3.0 (or secure IP) that ensures the integrity of the transmitted information. The site certificate would be shown when a control runs or requests additional privileges. This would have several advantages over code signing, including: in cases where the web pages also need to be authenticated, it is much simpler than requiring two separate mechanisms, and the account user 80 sees a single, consistent certificate; it is common for controls that need extra privileges, beyond the default environment or "sandbox" permissions for Java or scripts, to also require a secure (i.e. authenticated, and optionally private) connection back to the site that served them; it simplifies creating secure systems of co-operating controls and scripts that can span pages; individual controls can be revoked at any time, by removing them from all web sites; and an malicious user cannot reuse a signed control maliciously, because the controls themselves are never signed.

It is not difficult to spoof a MAC address, however, it is extremely difficult for a malicious user, such as a hacker or fraudster, to know what the MAC address is in the first place. In order to determine the MAC address, the malicious user would have to know specifically which client computer 20 was used to access the account, which is only really possible if they have direct access to the client computer 20 being used. Further security can be provided by checking the region of the IP address and verifying the IP addresses of the connecting computers to determine if attempts have been made to hide a computer's identity.

Given the above, fraud/hacking becomes possible only by malicious users who have physical access to the client computer 20 used to access the account or credit card. If this were to happen, a report can be provided showing exactly which MAC address and IP address was used to access the account, making it easy for a particular case to be disputed by a merchant.

The system according to the invention provides both convenience and security, and fraud prevention measures/actions to prevent access/purchases from unauthorized computers. The system is practical to implement and can compliment existing online authentication checks and/or purchases.

The system may be viewed as an online computer registry and fraud/hack prevention system. The system would be queried for any publisher or merchant that wants a significant security improvement with their system.

The logic follows:

New Account/Account Creation

Figure 2:
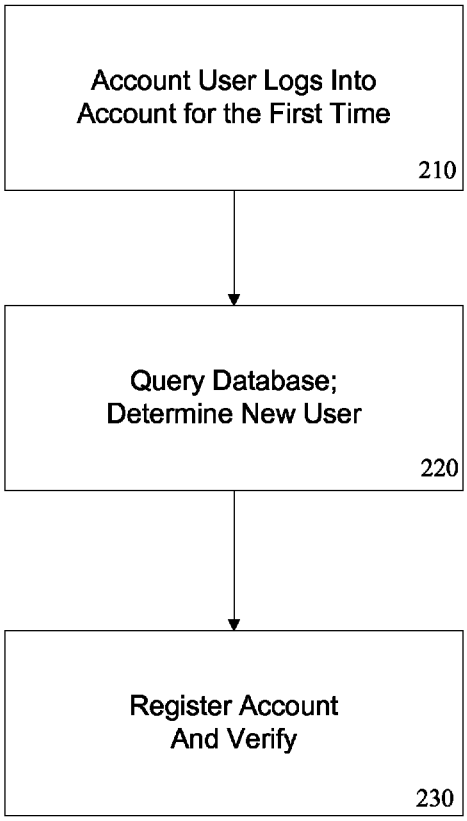
FIG. 2 is a flow chart showing the process by which an account is opened according to the invention.

As seen in FIG. 2, an embodiment of the process by which a new account is created includes the steps:

1. In step 210, an account user 10 using a client computer 20 logs into an online account provided by an account provider 80 for the first time, or purchases a good or service online with their credit card provided by a account provider 80, such as a credit card provider for the first time.
2. In step 220, database 90 at server 70 hosting the account or used by the credit card provider to maintain the credit card account is queried, and the system determines that this is the first time the particular account or credit card has been used online.
3. In step 230, the account is registered and verified. Depending on the security level selected by the administrator of the account provider 80, client computer 20 will either:
   (a) Automatically have its MAC address and IP address registered to the account or credit card and stored in database 90;
   (b) Receive an e-mail automatically emailed to the e-mail address provided to the account provider, to confirm that the account user 10 has made the request. If the account user 10 confirms the request, the MAC address and IP address of client computer 20 are registered with the account or credit card. If the account user 10 does not confirm the request, the account or credit card may automatically be suspended, and an administrator notified; or
   (c) Receive a phone call using the phone number provided to the account provider 80, to confirm that they have made the request. If the account user 10 confirms the request, the MAC address and IP address of the client computer 20 are registered with the account or credit card. If the account user 10 does not confirm the request, the account or credit card may be suspended, and an administrator notified. Optionally, an additional automated check could be made by an administrator using the account user's registered phone number to test the type of phone being used (PSTN line, cell phone, or VOIP). If the phone type is not appropriate (i.e. VOIP instead of a cell phone), the administrator could be notified for review and the account suspended.

Current Account/Fraud Prevention

Figure 3:
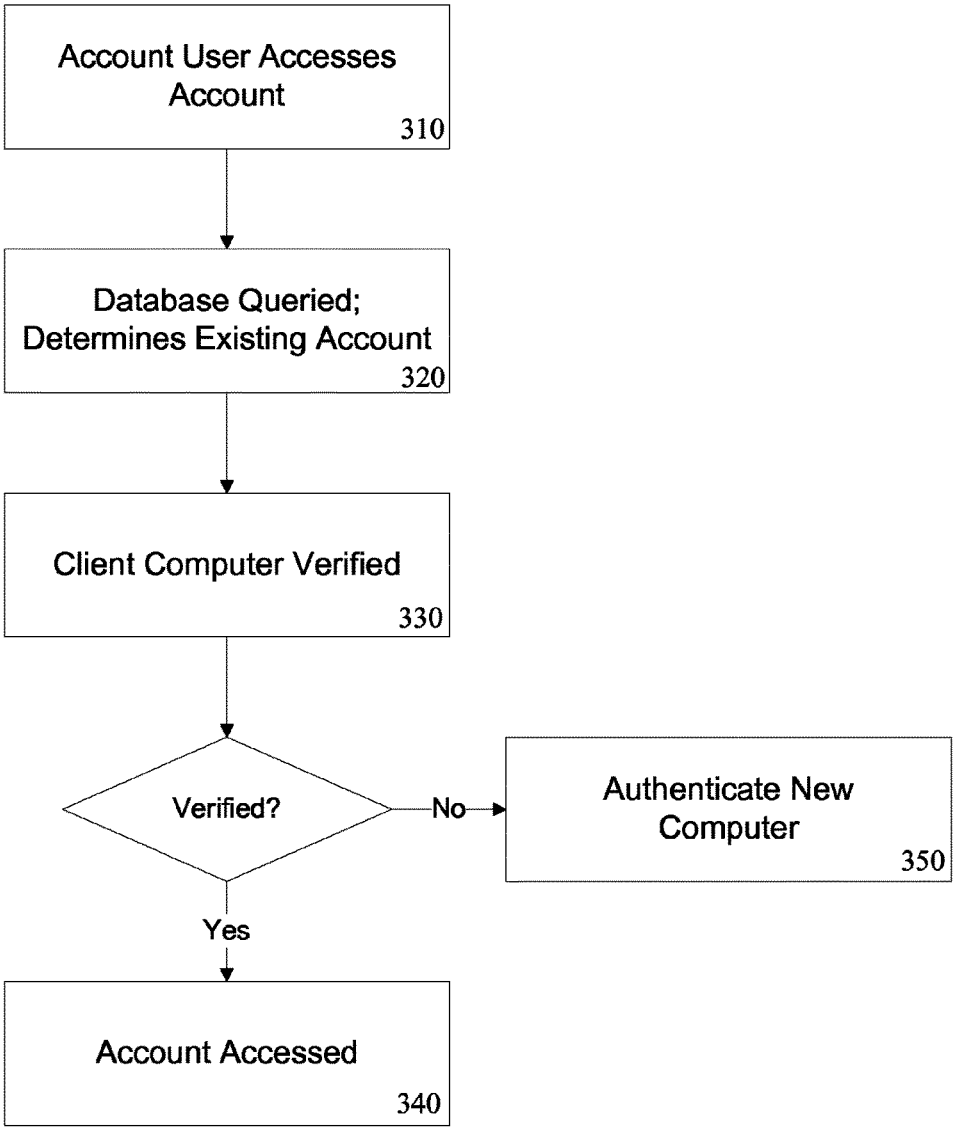
FIG. 3 is a flow chart showing the process by which an account is accessed according to the invention.

The system according to the invention can also be used to protect accounts by preventing unauthorized access to such accounts. In such a use, the following steps, as seen in FIG. 3, may occur:

1. In step 310, account user 10 logs into their existing online account, or makes a purchase with their credit card.
2. In step 320, database 90 is queried, and determines that the account accessed is an existing account.
3. In step 330, depending on the security level selected by the administrator, server 70 queries to the client computer 20 for verification purposes, specifically to determine if:
   (a) The MAC address of client computer 20 matches the account;
   (b) The MAC address of client computer 20 matches the account and the IP address of the client computer 20 is from the appropriate geographical region; and/or
   (c) The IP address is accurate and is not being spoofed.
4. In step 340, if the database query is successful, the authentication process or purchase continues as intended.
5. In step 350, if the database query is NOT successful, depending on the security level selected by the administrator, the following may happen:
   (a) Client computer 20 is automatically e-mailed (to the e-mail address provided to the administrator), to confirm that they have made the request. If client computer 20 confirms the request, the new MAC address and IP address are registered to the account or credit card. This automatically registers the additional computer for use with the account. If the client computer 20 does not confirm the request, the account or credit card may automatically be suspended, and an administrator notified; or (b) The account user 10 is automatically phoned (at the phone number provided to the administrator), to confirm that they have made the request. If the account user 10 confirms the request, the new MAC address and IP address are registered to the account or credit card. This automatically registers the additional client computer 20 for use with the account. If the account user 10 does not confirm the request, the account or credit card may automatically be suspended, and an administrator notified.

For investigative purposes, the system is able to provide the true IP address and MAC address of attempted frauds or hacks, thus allowing investigators to track down fraudsters or hackers, even if they are using proxy servers. Additional information could also be used by law enforcement to help gather information regarding online criminals and terrorists.

The system is automated and has significant revenue potential by having multiple database servers (co-located or licensed) to meet demand, and charge per usage fees for database queries and automated e-mail/call services. The system according to the invention thereby may save the online industry significant amounts of time and money.

Using the system, the only fraud/hacks possible are by people who have physical access to the client computer 20. Although it is possible to spoof IP and MAC addresses, it is virtually impossible to know (or find out) which MAC address is registered with the account, unless the malicious user knows which client computer 20 was used to register the account in the first place. The true IP address functionality also eliminates the risk of IP address spoofing by showing the true IP address used by each client computer in every online transaction. The system thereby can determine which client computer was used for the transaction, which would greatly limit a merchant's liability by proving that the transaction was completed at an authorized location.

Profiling

The system according to the invention can be used for anti-fraud/profiling purposes to allow users to look for and be notified of suspicious credit card activity. This additional protection helps make credit card transactions even more secure for online purchases.

At present credit card companies look for suspicious activity on their own. However, each credit card company sets its own criteria, which may not be suitable for every card user. The system according to the invention allows clients to determine themselves the types of purchases they want to allow with a particular credit card. For example, a card user may want to be notified if a purchase over $100 is made on their card, or if there is a purchase overseas, etc. The card users themselves know exactly how they plan on using their card, while the credit card providers do not.

If a suspicious transaction occurs, the card user can preselect to have the card immediately suspended or they can be sent an automated e-mail or phone call to confirm authorization of the purchase.

In this embodiment of the system, card users need be able to change their profile settings. For additional security, the system may require an automated confirmation e-mail or phone call to the account holder when any profile change is made.

Revenue Model.

An operator of the system using graduated licensing and usage fees may generate revenue. For example:

1. Co-located solution—the publisher, payment processor, or other party pays the operator a monthly fee for a fixed amount of queries to a database hosted on the operator's servers. This could be done on a shared server or a dedicated server (at an additional cost). The information stored may only be for the purpose of account verification, so that personal information would not have to be stored in the database. For example, the database may just have to store the account name, or the last digits of a credit card, and the MAC address of the client computer 20.
2. Local solution—the publisher, payment processor, etc. pays a license fee to run the software and database on their own server (this may be restricted by usage, but at a lower fee than as indicated above).
3. Security notifications—a charge per usage fee for automated security notifications to the account user by e-mail (if their account or credit card is being used on an additional computer), a higher fee may be charged for automated notifications by telephone.
4. Payment processors or credit card companies may offer these enhanced services to their merchants. Game publishers, etc., may consider the system to release resources otherwise tied up dealing with hacking/security issues.

In an alternative embodiment, payment processors may access a consolidated credit card security database for each transaction, so that no password would be required. This system would offer the convenience of not having to use a password, and complete peace of mind for the cardholder and the merchant, knowing that it is not possible to place an order from a computer that has not been authorized to do so.

The invention encompasses all modifications, permutations, additions and sub-combinations of the features described herein. Although the exemplary aspects and embodiments of the invention have been disclosed in detail for illustrative purposes, it will be recognized that permutations, additions, variations, sub-combinations or modifications of the disclosed apparatus lie within the scope of the present invention.

General Computing Information

The present invention can be implemented in numerous ways, including as a process, an apparatus, a system, a computer readable medium such as a computer readable storage medium or a computer network wherein program instructions are sent over optical or communication links. In this specification, these implementations, or any other form that the invention may take, may be referred to as systems or techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

The following discussion provides a brief and general description of a suitable computing environment in which various embodiments of the system may be implemented. Although not required, embodiments will be described in the general context of computer-executable instructions, such as program applications, modules, objects or macros being executed by a computer. Those skilled in the relevant art will appreciate that the invention can be practiced with other computer or microcomputer configurations, including handheld devices, Smartphones (for example, iPhone, Blackberry, Android), as an application on iPad or via multiprocessor systems, microprocessor-based or programmable consumer electronics, personal computers ("PCs"), network PCs, minicomputers, mainframe computers, and the like. The embodiments can be practiced in distributed computing environments where tasks or modules are performed by remote processing devices, which are linked through a communications network. In a distributed computing environment, program modules may be located in both local and remote memory storage devices.

A computer system may be used as a server including one or more processing units, system memories, and system buses that couple various system components including system memory to a processing unit. Computers will at times be referred to in the singular herein, but this is not intended to limit the application to a single computing system since in typical embodiments, there will be more than one computing system or other device involved. Other computer systems may be employed, such as conventional and personal computers, where the size or scale of the system allows. The processing unit may be any logic processing unit, such as one or more central processing units ("CPUs"), digital signal processors ("DSPs"), application-specific integrated circuits ("ASICs"), etc. Unless described otherwise, the construction and operation of the various components are of conventional design. As a result, such components need not be described in further detail herein, as they will be understood by those skilled in the relevant art.

A computer system includes a bus, and can employ any known bus structures or architectures, including a memory bus with memory controller, a peripheral bus, and a local bus. The computer system memory may include read-only memory ("ROM") and random access memory ("RAM"). A basic input/output system ("BIOS"), which can form part of the ROM, contains basic routines that help transfer information between elements within the computing system, such as during start-up.

The computer system also includes non-volatile memory. The non-volatile memory may take a variety of forms, for example a hard disk drive for reading from and writing to a hard disk, and an optical disk drive and a magnetic disk drive for reading from and writing to removable optical disks and magnetic disks, respectively. The optical disk can be a CD-ROM, while the magnetic disk can be a magnetic floppy disk or diskette. The hard disk drive, optical disk drive and magnetic disk drive communicate with the processing unit via the system bus. The hard disk drive, optical disk drive and magnetic disk drive may include appropriate interfaces or controllers coupled between such drives and the system bus, as is known by those skilled in the relevant art. The drives, and their associated computer-readable media, provide non-volatile storage of computer readable instructions, data structures, program modules and other data for the computing system. Although a computing system may employ hard disks, optical disks and/or magnetic disks, those skilled in the relevant art will appreciate that other types of non-volatile computer-readable media that can store data accessible by a computer system may be employed, such a magnetic cassettes, flash memory cards, digital video disks ("DVD"), Bernoulli cartridges, RAMs, ROMs, smart cards, etc.

Various program modules or application programs and/or data can be stored in the computer memory. For example, the system memory may store an operating system, end user application interfaces, server applications, and one or more application program interfaces ("APIs").

The computer system memory also includes one or more networking applications, for example a Web server application and/or Web client or browser application for permitting the computer to exchange data with sources via the Internet, corporate Intranets, or other networks as described below, as well as with other server applications on server computers such as those further discussed below. The networking application in the preferred embodiment is mark-up language based, such as hypertext mark-up language ("HTML"), extensible mark-up language ("XML") or wireless mark-up language ("WML"), and operates with mark-up languages that use syntactically delimited characters added to the data of a document to represent the structure of the document. A number of Web server applications and Web client or browser applications are commercially available, such those available from Mozilla and Microsoft.

The operating system and various applications/modules and/or data can be stored on the hard disk of the hard disk drive, the optical disk of the optical disk drive and/or the magnetic disk of the magnetic disk drive.

A computer system can operate in a networked environment using logical connections to one or more client computers and/or one or more database systems, such as one or more remote computers or networks. A computer may be logically connected to one or more client computers and/or database systems under any known method of permitting computers to communicate, for example through a network such as a local area network ("LAN") and/or a wide area network ("WAN") including, for example, the Internet. Such networking environments are well known including wired and wireless enterprise-wide computer networks, intranets, extranets, and the Internet. Other embodiments include other types of communication networks such as telecommunications networks, cellular networks, paging networks, and other mobile networks. The information sent or received via the communications channel may, or may not be encrypted. When used in a LAN networking environment, a computer is connected to the LAN through an adapter or network interface card (communicatively linked to the system bus). When used in a WAN networking environment, a computer may include an interface and modem or other device, such as a network interface card, for establishing communications over the WAN/Internet.

In a networked environment, program modules, application programs, or data, or portions thereof, can be stored in a computer for provision to the networked computers. In one embodiment, the computer is communicatively linked through a network with TCP/IP middle layer network protocols; however, other similar network protocol layers are used in other embodiments, such as user datagram protocol ("UDP"). Those skilled in the relevant art will readily recognize that these network connections are only some examples of establishing communications links between computers, and other links may be used, including wireless links.

While in most instances a computer will operate automatically, where an end user application interface is provided, a user can enter commands and information into the computer through a user application interface including input devices, such as a keyboard, and a pointing device, such as a mouse. Other input devices can include a microphone, joystick, scanner, etc. These and other input devices are connected to the processing unit through the user application interface, such as a serial port interface that couples to the system bus, although other interfaces, such as a parallel port, a game port, or a wireless interface, or a universal serial bus ("USB") can be used. A monitor or other display device is coupled to the bus via a video interface, such as a video adapter (not shown). The computer can include other output devices, such as speakers, printers, etc.

Further and in addition to the other computing system related disclosure provided herein, it will be readily apparent to one of ordinary skill in the art that the various processes and methods (and system) described herein may be implemented by, e.g., appropriately programmed general purpose computers, special purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions. Instructions may be embodied in, e.g., a computer program.

A "processor" means one or more microprocessors, central processing units (CPUs), computing devices, microcontrollers, digital signal processors, or like devices or any combination thereof.

Thus a description of a process is likewise a description of an apparatus for performing the process. The apparatus that performs the process can include, e.g., a processor and those input devices and output devices that are appropriate to perform the process.

Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" refers to any medium, a plurality of the same, or a combination of different media, that participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), SAP, ATP, Bluetooth™, and TCP/IP, TDMA, CDMA, and 3G; and/or (iv) encrypted to ensure privacy or prevent fraud in any of a variety of ways well known in the art.

Thus a description of a process is likewise a description of a computer-readable medium storing a program for performing the process. The computer-readable medium can store (in any appropriate format) those program elements which are appropriate to perform the method.

Just as the description of various steps in a process does not indicate that all the described steps are required, embodiments of an apparatus include a computer/computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device which accesses data in such a database.

Various embodiments can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel® Pentium® or Centrino™ processor, that are adapted to communicate with the computer. Any number and type of devices may be in communication with the computer.

In an embodiment, a server computer or centralized authority may not be necessary or desirable. For example, the present invention may, in an embodiment, be practiced on one or more devices without a central authority. In such an embodiment, any functions described herein as performed by the server computer or data described as stored on the server computer may instead be performed by or stored on one or more such devices.

Where a process is described, in an embodiment the process may operate without any user intervention. In another embodiment, the process includes some human intervention (e.g., a step is performed by or with the assistance of a human).

As will be apparent to those skilled in the art, the various embodiments described above can be combined to provide further embodiments. Aspects of the present systems, methods and components can be modified, if necessary, to employ systems, methods, components and concepts to provide yet further embodiments of the invention. For example, the various methods described above may omit some acts, include other acts, and/or execute acts in a different order than set out in the illustrated embodiments.

I claim:

1. A non-transitory computer-readable medium that stores instructions executable by one or more processors to perform a method for enhancing security between a client computer and a software server, the method comprising:

[providing a software server;]

[providing] *communicating with* a database, which is accessible by the software server, said database comprising a record associated with an account, said account associated with at least one profile identifier, wherein said account is associated with a geographic area, said software server receives *a geographic area associated with* an [IP] *Internet Protocol* (*IP*) address associated with said client computer, the software server comprises a security protocol, said security protocol indicating 1) which [profile identifiers] *of at least one profile identifier* of [a] *the* client computer must match [those] *at least one profile identifier* on [a] *the* client account and 2) how many [profile identifiers] *of at least one profile identifier* of [a] *the* client computer must match [those] *at least one profile identifier* on [a] *the* client account, and the [profile identifiers are] *at least one profile identifier is* selected from the group consisting of:

a. [CPU] *Computer Processing Unit* (*CPU*) serial and/or model number[;], b. Motherboard serial and/or model number[;], c. Hard Drive serial and/or model number[;], d. Admin [SSID] *Service Set Identifier* (*SSID*) or [UUID] *Universally Unique Identifier* (*UUID*) provided by the operating system[;], e. Manufacturer assigned computer system serial number and/or model number[;], f. [CD-ROM] *Compact Disk Read Only Memory* (*CD-ROM*), [DVD-ROM] *Digital Versatile Disk Read Only Memory* (*DVD-ROM*) or other internal mass media storage device serial and/or model number[;], g. [BIOS] *Basic Input Output System* (*BIOS*) serial and/or model number[;], h. [MAC] *Media Access Control* (*MAC*) address, i. Monitor serial and/or model number, j. [RAM] *Random Access Memory* (*RAM*) serial and/or model number[;], k. An universally unique identifier (UUID) or globally unique identifier (GUID) associated with the client computer or a vendor of the client computer, l. BIOS Manufacturer, m. BIOS Release Date[;], and n. Vendor and Device [IDs] *Identifiers* (*IDs*) of all installed [PCI] *Peripheral Component Interconnect* (*PCI*) devices *on the client computer*;

receiving from the client computer, by the software server, at least one profile identifier associated with said client computer;

comparing said at least one profile identifier associated with said client computer to said at least one profile identifier associated with said account;

*comparing the geographic area associated with the IP address of the client computer to the geographic area associated with the account;* when said at least one profile identifier associated with said client computer is the same as said at least one profile identifier associated with said account, permitting access to said account;

when said at least one profile identifier associated with said client computer is not the same as said at least one profile identifier associated with said account, communicating with said client computer to determine if access to said account should be permitted;

denying access to said account, if said geographic area associated with said IP address is not the same as said geographic area associated with said account or said at least one profile identifier of said client computer is not the same as said at least one profile identifier associated with said account[,]; and notifying [a law enforcement authority] *an administrator* of the IP address and at least one profile identifier of said client computer, if said geographic area associated with said IP address is not the same as said geographic area associated with said account and said at least one profile identifier of said client computer is not the same as said at least one profile identifier associated with said account.

2. The non-transitory computer-readable medium of claim 1, wherein said account is associated with biometric information related to a user.

3. The non-transitory computer-readable medium of claim 2, wherein said software server receives said biometric information from said client computer.

*4. A non-transitory computer-readable medium that stores instructions executable by one or more processors to perform a method for enhancing security, the method comprising:*

*providing an account;*

*communicating with a database accessible by a software server having a security protocol for permitting access to the account, the database comprising at least one profile identifier associated with the account and a geographic area associated with the account;*

*receiving from a client computer, by the software server, at least one profile identifier associated with the client computer and a geographic area associated with an Internet Protocol (IP) address of the client computer;*

*comparing the at least one profile identifier associated with the client computer to the at least one profile identifier associated with the account;*

*comparing the geographic area associated with the IP address of the client computer to the geographic area associated with the account;*

*wherein when the at least one profile identifier associated with the client computer is the same as the at least one profile identifier associated with the account, permitting the client computer access to the account;*

*wherein when the at least one profile identifier associated with the client computer is not the same as the at least one profile identifier associated with the account, communicating with the client computer to determine if access to the account should be permitted;*

*wherein when the geographic area associated with the IP address of the client computer is not the same as the geographic area associated with the account and when*

*the at least one profile identifier associated with the client computer is not the same as the at least one profile identifier associated with the account, notifying an administrator;*

*wherein the at least one profile identifier associated with the account is selected from the group consisting of: a Computer Processing Unit (CPU) serial number, a CPU model number; a motherboard serial number, a motherboard model number, a hard drive serial number, a hard drive model number, an admin Service Set Identifier (SSID) provided by the operating system, an admin Universally Unique Identifier (UUID) provided by the operating system, a manufacturer assigned computer system serial number, a manufacturer assigned computer system model number, a Compact Disk Read Only Memory (CD-ROM) serial number, a CD-ROM model number, a Digital Versatile Disk Read Only Memory (DVD-ROM) serial number, a DVD-ROM model number, an internal mass media storage device serial number, an internal mass media storage device model number, a Basic Input Output System (BIOS) serial number, a BIOS model number, a Media Access Control (MAC) address, a monitor serial number, a monitor model number, a Random Access Memory (RAM) serial number, a RAM model number, a universally unique identifier (UUID) associated with the client computer, a universally unique identifier (UUID) associated with a vendor of the client computer, a globally unique identifier (GUID) associated with the client computer, a globally unique identifier (GUID) associated with a vendor of the client computer, a BIOS manufacturer, a BIOS release date, vendor and device Identifiers (IDs) of all installed Peripheral Component Interconnect (PCI) devices on the client computer;*

*wherein the at least one profile identifier associated with the client computer is selected from the group consisting of: a CPU serial number, a CPU model number; a motherboard serial number, a motherboard model number, a hard drive serial number, a hard drive model number, an admin SSID provided by the operating system, an admin UUID provided by the operating system, a manufacturer assigned computer system serial number, a manufacturer assigned computer system model number, a CD-ROM serial number, a CD-ROM model number, a DVD-ROM serial number, a DVD-ROM model number, an internal mass media storage device serial number, an internal mass media storage device model number, a BIOS serial number, a BIOS model number, a MAC address, a monitor serial number, a monitor model number, a RAM serial number, a RAM model number, a universally unique identifier (UUID) associated with the client computer, a universally unique identifier (UUID) associated with a vendor of the client computer, a globally unique identifier (GUID) associated with the client computer, a globally unique identifier (GUID) associated with a vendor of the client computer, a BIOS manufacturer, a BIOS release date, vendor and device IDs of all installed PCI devices on the client computer.*

*5. The non-transitory computer-readable medium of claim 4, wherein the account is associated with biometric information related to a user of the account.*

*6. The non-transitory computer-readable medium of claim 5, wherein the software server receives said biometric information from the client computer.*

*7. The non-transitory computer-readable medium of claim 4, wherein the database is accessible by the software server.*

*8. The non-transitory computer-readable medium of claim 4, wherein communicating with the database comprising the at least one profile identifier associated with the account and the geographic area associated with the account, comprises:*

*registering the account with the at least one profile identifier associated with the account and the geographic area associated with the account.*

*9. The non-transitory computer-readable medium of claim 8, wherein registering the account with the at least one profile identifier associated with the account and the geographic area associated with the account comprises automatically registering the account with the at least one profile identifier associated with the account and the geographic area associated with the account.*

*10. The non-transitory computer-readable medium of claim 4, wherein the administrator is an administrator of the software server.*

*11. The non-transitory computer-readable medium of claim 4, wherein when the geographic area associated with the client computer is not the same as the geographic area associated with the account or when the at least one profile identifier associated with the client computer is not the same as the at least one profile identifier associated with the account, denying the client computer access to the account.*

*12. The non-transitory computer-readable medium of claim 11, wherein notifying the administrator comprises notifying the administrator of the geographic area associated with the client computer and the at least one profile identifier associated with the client computer.*

*13. A non-transitory computer-readable medium that stores instructions executable by one or more processors to perform a method, the method comprising:*

*providing an account, wherein the account is associated with a user;*

*providing a security protocol;*

*communicating with a database;*

*storing at least one profile identifier and a geographic location associated with the account on the database;*

*detecting an attempt to access the account by a computer;*

*determining at least one profile identifier associated with the computer and a geographic location associated with the computer;*

*comparing the at least one profile identifier associated with the account to the at least one profile identifier associated with the computer;*

*comparing the geographic location associated with the account to the geographic location associated with the computer;*

*permitting the computer access to the account when 1) the at least one profile identifier associated with the account is the same as the at least one profile identifier associated with the computer and 2) the geographic location associated with the account is the same as the geographic location associated with the computer;*

*communicating with the user to determine if access to the account should be permitted when the at least one profile identifier associated with the account is different from the at least one profile identifier associated with the computer;*

*reporting the at least one profile identifier associated with the computer and the geographic location associated with the computer to an administrator of the at least one profile identifier when 1) the at least one profile*

*identifier associated with the account is different from the at least one profile identifier associated with the computer and 2) the geographic location associated with the account is different from the geographic location associated with the computer;*

*wherein said at least one profile identifier associated with said account is selected from the group consisting of: a Computer Processing Unit (CPU) serial number, a CPU model number; a motherboard serial number, a motherboard model number, a hard drive serial number, a hard drive model number, an admin Service Set Identifier (SSID) provided by the operating system, an admin Universally Unique Identifier (UUID) provided by the operating system, a manufacturer assigned computer system serial number, a manufacturer assigned computer system model number, a Compact Disk Read Only Memory (CD-ROM) serial number, a CD-ROM model number, a Digital Versatile Disk Read Only Memory (DVD-ROM) serial number, a DVD-ROM model number, an internal mass media storage device serial number, an internal mass media storage device model number, a Basic Input Output System (BIOS) serial number, a BIOS model number, a Media Access Control (MAC) address, a monitor serial number, a monitor model number, a Random Access Memory (RAM) serial number, a RAM model number, a universally unique identifier (UUID) associated with the client computer, a universally unique identifier (UUID) associated with a vendor of the client computer, a globally unique identifier (GUID) associated with the client computer, a globally unique identifier (GUID) associated with a vendor of the client computer, a BIOS manufacturer, a BIOS release date, vendor and device Identifiers (IDs) of all installed Peripheral Component Interconnect (PCI) devices on the client computer;*

*wherein said at least one profile identifier associated with said client computer is selected from the group consisting of: a CPU serial number, a CPU model number; a motherboard serial number, a motherboard model number, a hard drive serial number, a hard drive model number, an admin SSID provided by the operating system, an admin UUID provided by the operating system, a manufacturer assigned computer system serial number, a manufacturer assigned computer system model number, a CD-ROM serial number, a CD-ROM model number, a DVD-ROM serial number, a DVD-ROM model number, an internal mass media storage device serial number, an internal mass media storage device model number, a BIOS serial number, a BIOS model number, a MAC address, a monitor serial number, a monitor model number, a Identifiers RAM serial number, a RAM model number, a universally unique identifier (UUID) associated with the client computer, a universally unique identifier (UUID) associated with a vendor of the client computer, a globally unique identifier (GUID) associated with the client computer, a globally unique identifier (GUID) associated with a vendor of the client computer, a BIOS manufacturer, a BIOS release date, vendor and device IDs of all installed Peripheral Component Interconnect PCI devices on the client computer.*

*14. The non-transitory computer-readable medium of claim 13, wherein the reporting the at least one profile identifier associated with the computer and the geographic location associated with the computer to the administrator of the at least one profile identifier when 1) the at least one profile identifier associated with the account is different from the at least one profile identifier associated with the computer and 2) the geographic location associated with the account is different from the geographic location associated with the computer comprises:*

*notifying the administrator of the at least one profile identifier associated with the computer and the geographic location associated with the computer.*

*15. The non-transitory computer-readable medium of claim 14, further comprising communicating with the user to confirm whether the user attempted to access the account with the computer when 1) the at least one profile identifier associated with the account is different from the at least one profile identifier associated with the computer and 2) the geographic location associated with the account is different from the geographic location associated with the computer.*

*16. The non-transitory computer-readable medium of claim 15, further comprising:*

*when the user confirms that the user attempted to access the account with the computer:*

*permitting the computer access to the account, and*

*storing the at least one profile identifier and the geographic location associated with the computer on the database as another at least one profile identifier and another geographic location associated with the account;*

*when the user does not confirm that the user attempted to access the account with the computer:*

*suspending the account, and*

*notifying the administrator.*

*17. The non-transitory computer-readable medium of claim 13, wherein the security protocol is configured to permit the computer access to the account when 1) the at least one profile identifier associated with the account is the same as the at least one profile identifier associated with the computer and 2) the geographic location associated with the account is the same as the geographic location associated with the computer, said security protocol indicating:*

*which of the at least one profile identifier associated with the computer must match the at least one profile identifier associated with the account, and*

*a number of the at least one profile identifier associated with the computer which must match the at least one profile identifier associated with the account.*

*18. The non-transitory computer-readable medium of claim 13, wherein determining the geographic location associated with the computer, comprises:*

*determining an IP address associated with the computer; and*

*determining the geographic area associated with the computer from the IP address associated with the computer.*

*19. A non-transitory computer-readable medium that stores instructions executable by one or more processors to perform a method, the method comprising:*

*registering an account associated with a user, wherein the account is associated with at least one profile identifier and a geographic location;*

*determining a geographic location associated with a computer attempting to access the account;*

*providing a security protocol for permitting access to the account, wherein the security profile determines at least one profile identifier associated with the computer attempting to access the account which must match at least one profile identifier associated with the account;*

*determining at least one profile identifier associated with the computer attempting to access the account;*

*comparing the at least one profile identifier associated with the account to the at least one profile identifier associated with the computer;*

*comparing the geographic location associated with the account to the geographic location associated with the computer;*

*permitting the computer access to the account when 1) the at least one profile identifier associated with the account is the same as the at least one profile identifier associated with the computer and 2) the geographic location associated with the account is the same as the geographic location associated with the computer;*

*denying the computer access to the account when the at least one profile identifier associated with the account is not the same as the at least one profile identifier associated with the computer;*

*communicating with the user or computer to determine if access to the account should be permitted when the at least one profile identifier associated with the account is not the same as the at least one profile identifier associated with the computer;*

*notifying an administrator when 1) the at least one profile identifier associated with the account is different from the at least one profile identifier associated with the computer and 2) the geographic location associated with the account is different from the geographic location associated with the computer;*

*wherein said at least one profile identifier associated with said account is selected from the group consisting of: a Computer Processing Unit (CPU) serial number, a CPU model number; a motherboard serial number, a motherboard model number, a hard drive serial number, a hard drive model number, an admin Service Set Identifier (SSID) provided by the operating system, an admin Universally Unique Identifier (UUID) provided by the operating system, a manufacturer assigned computer system serial number, a manufacturer assigned computer system model number, a Compact Disk Read Only Memory (CD-ROM) serial number, a CD-ROM model number, a Digital Versatile Disk Read Only Memory (DVD-ROM) serial number, a DVD-ROM model number, an internal mass media storage device serial number, an internal mass media storage device model number, a Basic Input Output System (BIOS) serial number, a BIOS model number, a Media Access Control (MAC) address, a monitor serial number, a monitor model number, a Random Access Memory (RAM) serial number, a RAM model number, a universally unique identifier (UUID) associated with the client computer, a universally unique identifier (UUID) associated with a vendor of the client computer, a globally unique identifier (GUID) associated with the client computer, a globally unique identifier (GUID) associated with a vendor of the client computer, a BIOS manufacturer, a BIOS release date, vendor and device (IDs) of all installed Peripheral Component Interconnect (PCI) devices on the client computer;*

*wherein said at least one profile identifier associated with said client computer is selected from the group consisting of: a CPU serial number, a CPU model number; a motherboard serial number, a motherboard model number, a hard drive serial number, a hard drive model number, an admin SSID provided by the operating system, an admin UUID provided by the operating system, a manufacturer assigned computer system serial number, a manufacturer assigned computer system model number, a CD-ROM serial number, a CD-ROM model number, a DVD-ROM serial number, a DVD-ROM model number, an internal mass media storage device serial number, an internal mass media storage device model number, a BIOS serial number, a BIOS model number, a MAC address, a monitor serial number, a monitor model number, a RAM serial number, a RAM model number, a universally unique identifier (UUID) associated with the client computer, a universally unique identifier (UUID) associated with a vendor of the client computer, a globally unique identifier (GUID) associated with the client computer, a globally unique identifier (GUID) associated with a vendor of the client computer, a BIOS manufacturer, a BIOS release date, vendor and device IDs of all installed PCI devices on the client computer.*

* * * * *